United States Patent [19]
Gotou

[11] Patent Number: 5,974,260
[45] Date of Patent: Oct. 26, 1999

[54] DATA PROCESSOR TO CONTROL A SEQUENCE OF INSTRUCTIONS TO BE EXECUTED BY REARRANGING THE INSTRUCTION BLOCKS

[75] Inventor: Harutaka Gotou, Tokyo, Japan

[73] Assignee: Kabushiki Kaisha Toshiba, Kawasaki, Japan

[21] Appl. No.: 08/947,853

[22] Filed: Oct. 9, 1997

[30] Foreign Application Priority Data

Oct. 9, 1996 [JP] Japan .................................... 8-268752

[51] Int. Cl.[6] ...................................................... G06F 13/00
[52] U.S. Cl. ............................... 395/800.32; 395/800.25; 395/800.26; 395/384; 395/584
[58] Field of Search .......................... 395/800.32, 800.25, 395/800.26, 384, 392, 580, 583, 584, 586, 587, 595

[56] References Cited

U.S. PATENT DOCUMENTS

| | | | |
|---|---|---|---|
| 5,732,243 | 3/1998 | McMahan | 395/464 |
| 5,822,574 | 10/1998 | Tran | 395/580 |
| 5,835,951 | 11/1998 | McMahan | 711/148 |

*Primary Examiner*—Meng-Ai T. An
*Assistant Examiner*—Dzung C. Nguyen
*Attorney, Agent, or Firm*—Foley & Lardner

[57] ABSTRACT

A data processor employs simple hardware to improve the efficiency of supplying instructions. The data processor has a cache memory to store blocks of instructions. Each block is divided into at least two sub-blocks. The data processor is capable of simultaneously reading sub-blocks belonging to different blocks and rearranging the read sub-blocks in order.

6 Claims, 13 Drawing Sheets

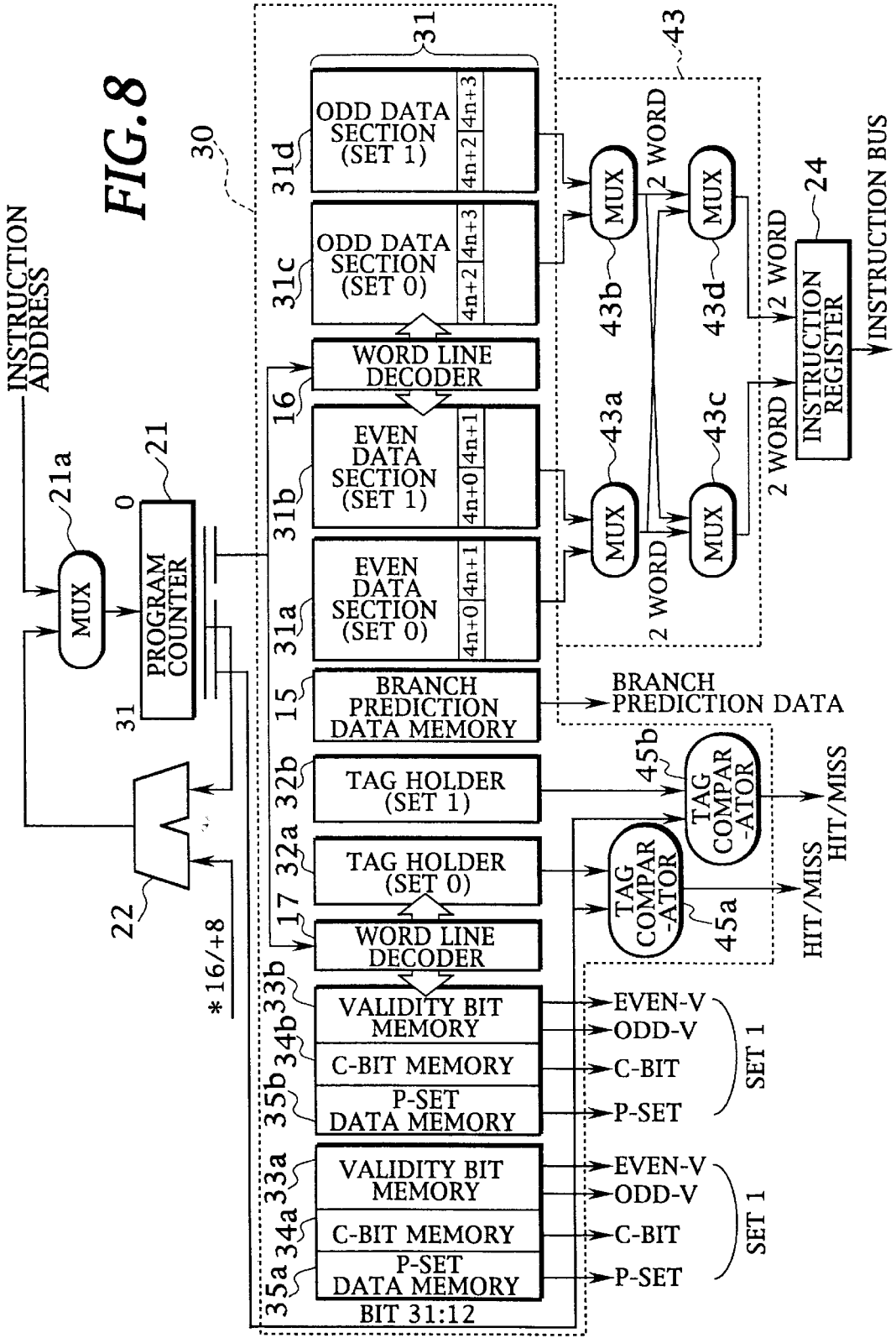

FIG.11
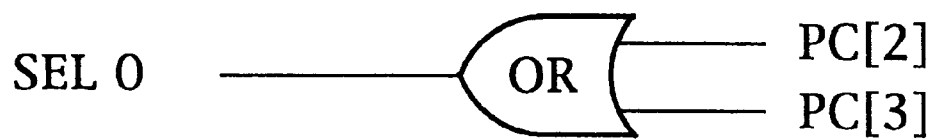
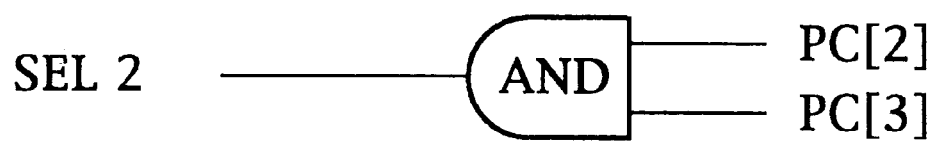

DATA PROCESSOR TO CONTROL A SEQUENCE OF INSTRUCTIONS TO BE EXECUTED BY REARRANGING THE INSTRUCTION BLOCKS

BACKGROUND OF THE INVENTION

1. Field of the Invention

The present invention relates to a data processor capable of efficiently supplying instructions.

2. Description of the Prior Art

Recent processors are capable of simultaneously executing several instructions. These processors need a device to supply a sufficient number of instructions thereto so that they can execute them without interruption. Such an instruction supplying device usually has an instruction fetch mechanism and a branch prediction mechanism. The instruction fetch mechanism fetches instructions block by block and keeps them in an instruction cache.

FIG. 1 shows an example of the instruction fetch mechanism according to a prior art. A CPU 101 reads instructions block by block out of a main memory 102 and stores them in an instruction cache 103. Each block of instructions consists of four words in the example, and blocks are numbered n, n+1, n+3, and the like. Transfer of instructions from the main memory 102 to the instruction cache 103 is carried out with, for example, 4-word burst transfer.

The cached instructions are supplied to pipelines of the CPU 101 block by block. Even a branch target instruction is transferred in a block from the main memory 102.

FIG. 2 shows examples of blocks of words representing instructions fetched from the main memory 102 to the instruction cache 103. A block supplied at time t contains a branch target instruction 4n+3. This instruction is not at the head of the block, and instructions 4n+0 to 4n+2 in the same block are not executed. This sort of branch instruction deteriorates instruction fetching efficiency because it reduces the number of instructions supplied to the CPU 101.

To solve this problem, one idea is to fetch a block of instructions from the main memory 102 with a branch target instruction being at the head of the block. This, however, is very difficult to practically achieve because of the structure of the instruction cache.

A practical solution of the problem is to use branch prediction hardware to pick up a branch target instruction in advance. Branch prediction is carried out by holding historical data on branch instructions executed before. The historical data is referred to for predicting whether or not a branch occurs, and according to the prediction, the next instruction is read in advance. The branch prediction is usually practiced with a branch target buffer.

The branch target buffer employs a branch instruction table, a target table, a branch prediction flag, and a comparator. The branch instruction table stores the lower addresses of branch instructions that are accessible with the lower bits of a given instruction stored in a program counter. The target table stores branch target addresses corresponding to the branch instructions stored in the branch instruction table. The comparator determines whether or not a given instruction will branch.

More precisely, the program counter stores the address of an instruction to be executed. If the address agrees with one of the entries in the branch instruction table, the instruction in question is a branch instruction. Then, a target address related to the branch instruction is read out of the target table and is set as a next value in the program counter. If the address agrees with none of the entries in the branch instruction table, the instruction in question is not a branch instruction, and the program counter is normally updated.

FIG. 3 shows an extended branch target buffer according to a prior art. This prior art stores not only branch target addresses but also branch target instructions themselves in the branch target buffer 104. Namely, the buffer 104 stores a copy of an instruction cache 103, to supply instructions to CPU pipelines incessantly.

FIG. 4 shows blocks of instructions handled by the instruction cache 103 and branch target buffer 104. If a branch target of a given branch instruction is 4n+3, a block starting from 4n+3 followed by 4n+4 to 4n+6 is stored in the buffer 104. At time t-1, the block of 4n+3 to 4n+6 is read out of the buffer 104 and is supplied to CPU pipelines. At time t, the instructions up to 4n+6 have been executed, and therefore, 4n+7, etc., are read out of the instruction cache 103.

A disadvantage of this technique is that the branch target buffer 104 must have a large capacity to improve instruction supply performance. This increases necessary hardware.

Namely, to improve the efficiency of supplying instructions, the branch target buffer 104 must store not only branch target addresses but also branch target instructions, or even several sequences of branch target instructions. This results in increasing the capacity of the buffer 104, to deteriorate prediction performance and increase hardware costs.

SUMMARY OF THE INVENTION

An object of the present invention is to provide a data processor that employs simple hardware to improve instruction supply efficiency.

Another object of the present invention is to provide a data processor that employs simple hardware to efficiently control a sequence of instructions to be executed.

In order to accomplish the objects, an aspect of the present invention provides a data processor having a program counter and a cache memory. The program counter stores positional data on an instruction to be executed. The cache memory includes a data memory, a tag holder, and a tag comparator. The data memory stores blocks of instructions, each block being composed of at least two sub-blocks each containing words that represent corresponding ones of the instructions. The tag holder holds tags related to the blocks stored in the data memory, the tags indicating the positions of the blocks in an external main memory. The tag comparator compares a tag contained in the positional data stored in the program counter with a specified one of the tags stored in the tag holder and provides a hit result or a mishit result. If the tag comparator provides a hit result, a block of instructions are simultaneously read out of the data memory according to the positional data stored in the program counter. The block to be read is composed of sub-blocks that belong to the same block or different blocks in the data memory. If the tag comparator provides a mishit result, the data memory is refilled with required instructions fetched from the external main memory. The read sub-blocks are rearranged by an aligner if they have belonged to different blocks in the data memory.

In this way, the data processor rearranges the sub-blocks of a read block if they have belonged to different blocks in the data memory, so that a branch target instruction is always brought to the head of the read block.

The cache memory stores first information for each of the blocks stored in the data memory, to indicate whether or not the block is a continuation of the preceding block. The data memory is formed so that the sub-blocks of adjacent blocks in the data memory are separately accessible according to partial information stored in the program counter. The aligner rearranges read sub-blocks in order if they have belonged to different blocks in the data memory and if the first information related to the different blocks indicates that the different blocks are continuous with each other. The present invention realizes these arrangements with simple hardware.

The cache memory may store second information for each of the blocks stored in the data memory, to indicate whether or not the sub-blocks of the block are valid, and any block of instructions read out of the data memory is validated or invalidated according to the second information corresponding thereto.

Another aspect of the present invention provides a data processor having a program counter and a set-associative cache memory. The program counter stores positional data on an instruction to be executed. The cache memory consists of a data memory, a tag holder, and a tag comparator. The data memory stores blocks of instructions, each block being composed of sub-blocks. The tag holder holds tags related to the blocks stored in the data memory, the tags indicating the positions of the blocks in an external main memory that is divided into a plurality of sets. The tag comparator compares a tag contained in the positional data stored in the program counter with a specified one of the tags stored in the tag holder and provides a hit result or a mishit result. If the tag comparator provides a hit result, a block of instructions are simultaneously read out of the data memory according to the positional data stored in the program counter. The block to be read is composed of sub-blocks that belong to the same block or adjacent blocks in the data memory. If the tag comparator provides a mishit result, the data memory is refilled with required instructions fetched from a proper one of the sets of the external main memory. The cache memory stores first information for each of the blocks stored in the data memory, to indicate whether or not the block is a continuation of the preceding block. The data memory is formed so that the sub-blocks of adjacent blocks in the data memory are separately accessible according to partial information stored in the program counter. Read sub-blocks are rearranged in order if they have belonged to adjacent blocks in the data memory and if the first information related to the adjacent blocks indicates that the adjacent blocks are continuous with each other.

Still another aspect of the present invention provides a data processor having a program counter and a cache memory. The program counter stores positional data on an instruction to be executed. The cache memory is composed of a data memory, a tag holder, and a tag comparator. The data memory stores blocks of instructions, each block being composed of words that represent instructions. The tag holder holds tags related to the blocks stored in the data memory, the tags indicating the positions of the blocks in an external main memory. The tag comparator compares a tag contained in the positional data stored in the program counter with a specified one of the tags stored in the tag holder and provides a hit result or a mishit result. The cache memory stores first information for each of the blocks stored in the data memory, to indicate whether or not the block is a continuation of the preceding block. If the tag comparator provides a hit result, a block of words (instructions) are simultaneously read out of the data memory according to the positional data stored in the program counter. The block to be read is composed of words that belong to the same block or different blocks in the data memory. If the tag comparator provides a mishit result, the data memory is refilled with required instructions fetched from the external main memory. Read words are rearranged in order if the words have belonged to adjacent blocks in the data memory and if the first information related to the adjacent blocks indicates that the adjacent blocks are continuous with each other. This aspect rearranges a block of words read out of the cache memory in order so that a branch target instruction is always brought to the head of the block, thereby improving the efficiency of supplying instructions.

BRIEF DESCRIPTION OF THE DRAWINGS

FIG. 8 shows a data processor according to a second embodiment of the present invention;

FIG. 11 shows logic circuits for generating control signals for the word line decoder of FIG. 10.

DETAILED DESCRIPTION OF THE EMBODIMENTS

The embodiments of the present invention will be described with reference to the accompanying drawings.

Figure 1:
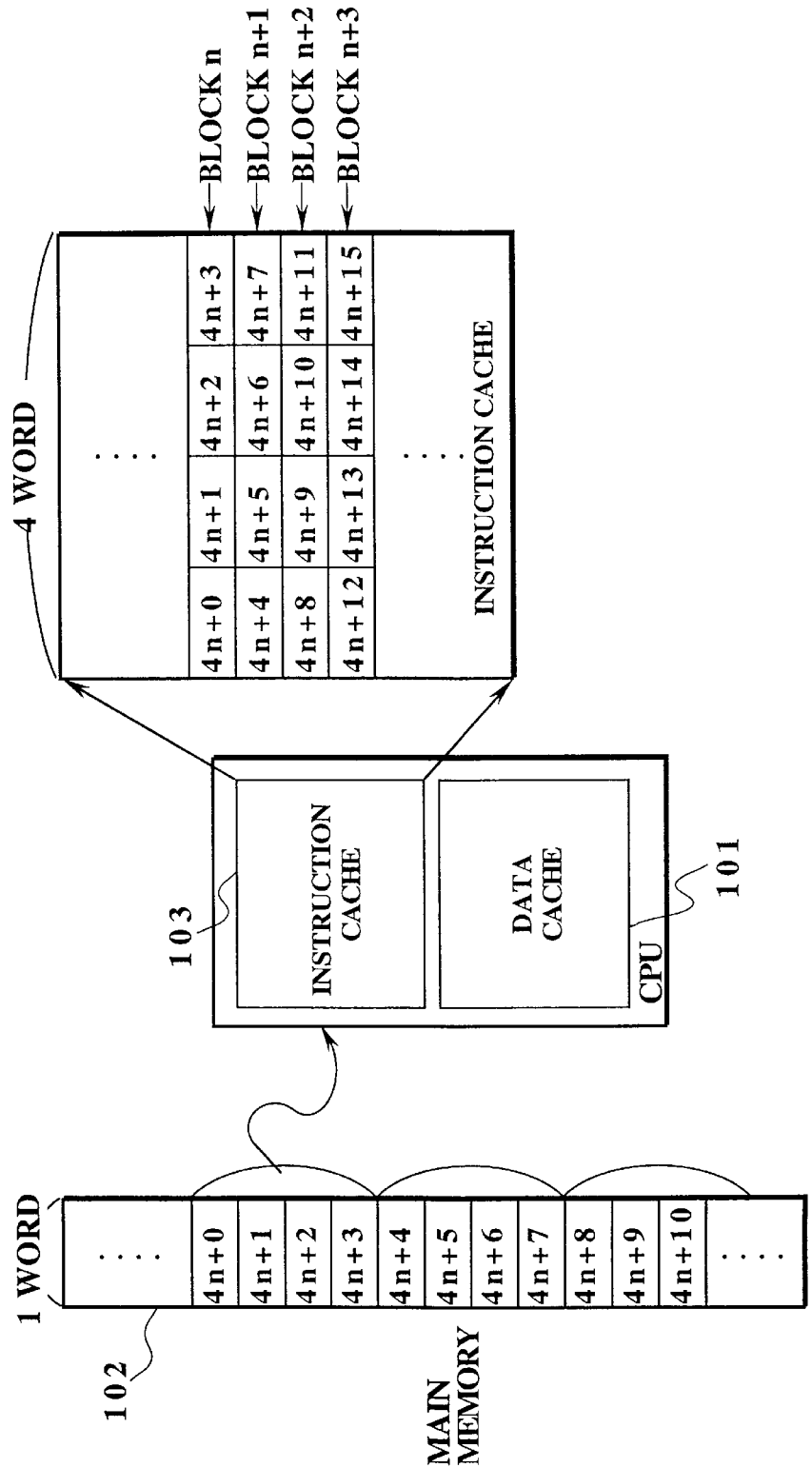
FIG. 1 shows an instruction fetching mechanism according to a prior art.
Figure 2:
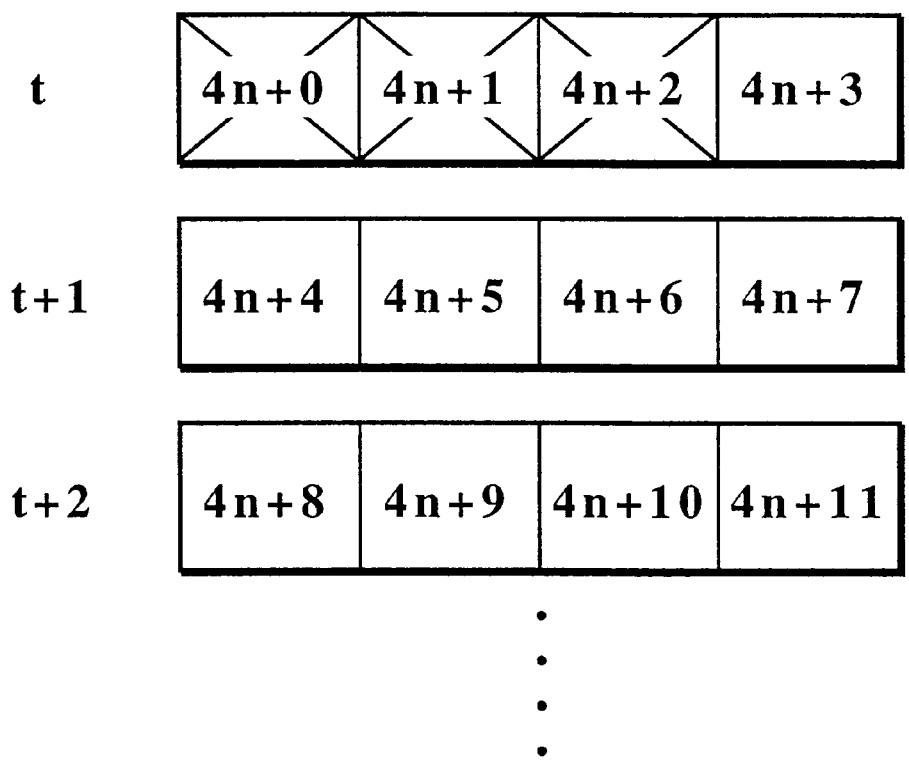
FIG. 2 shows a way of fetching a branch target instruction with the mechanism of FIG. 1.
Figure 3:
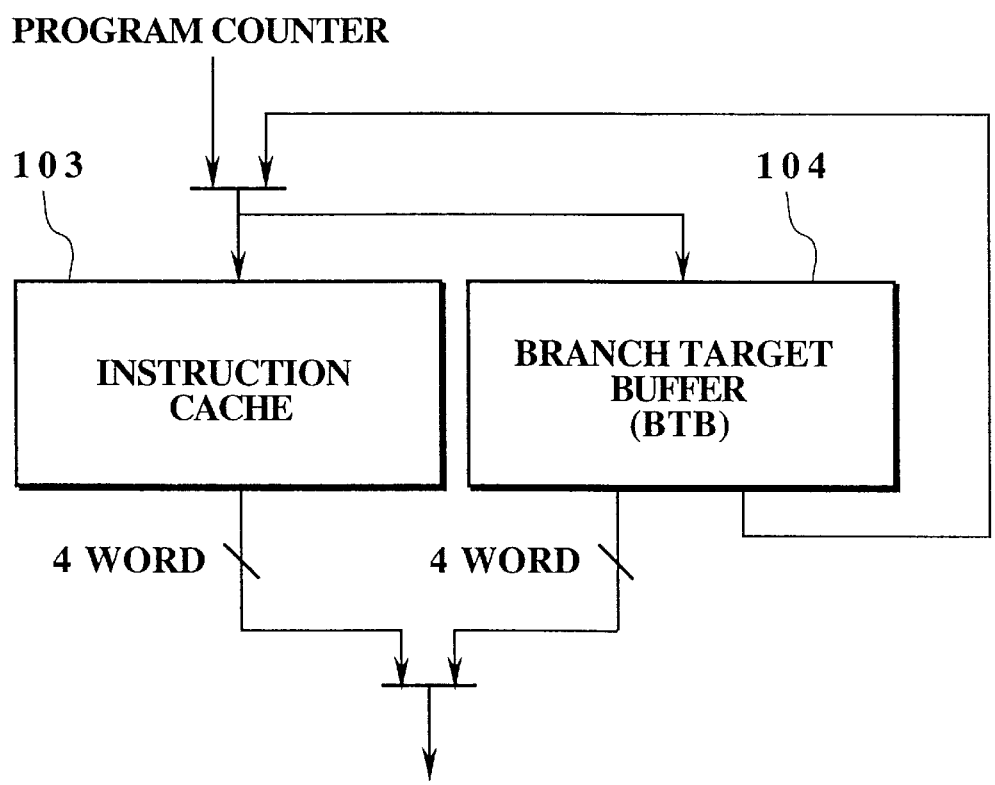
FIG. 3 shows an instruction fetching mechanism according to another prior art.
Figure 4:
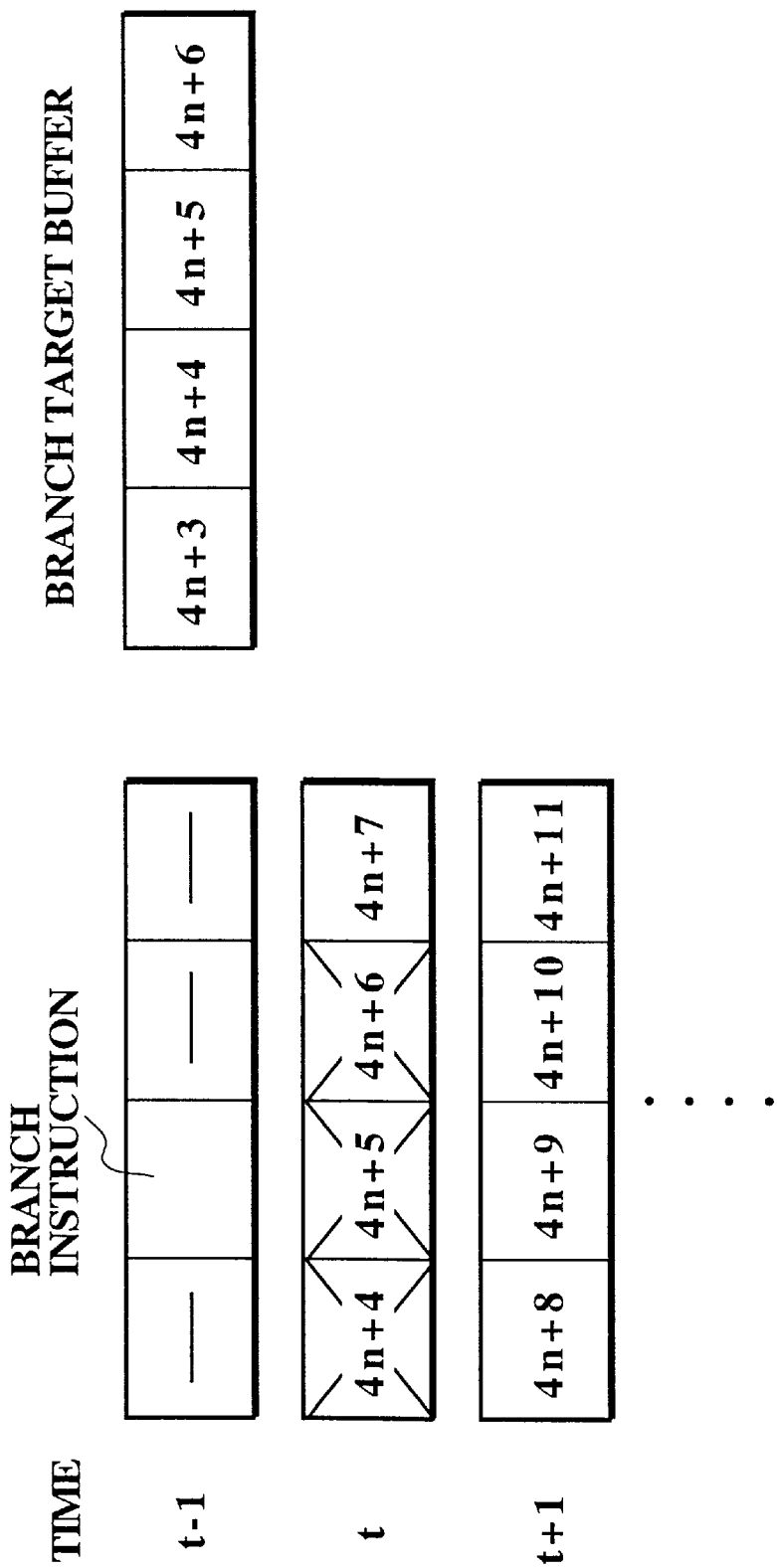
FIG. 4 shows a way of fetching a branch target instruction with the mechanism of FIG. 3.
Figure 5:
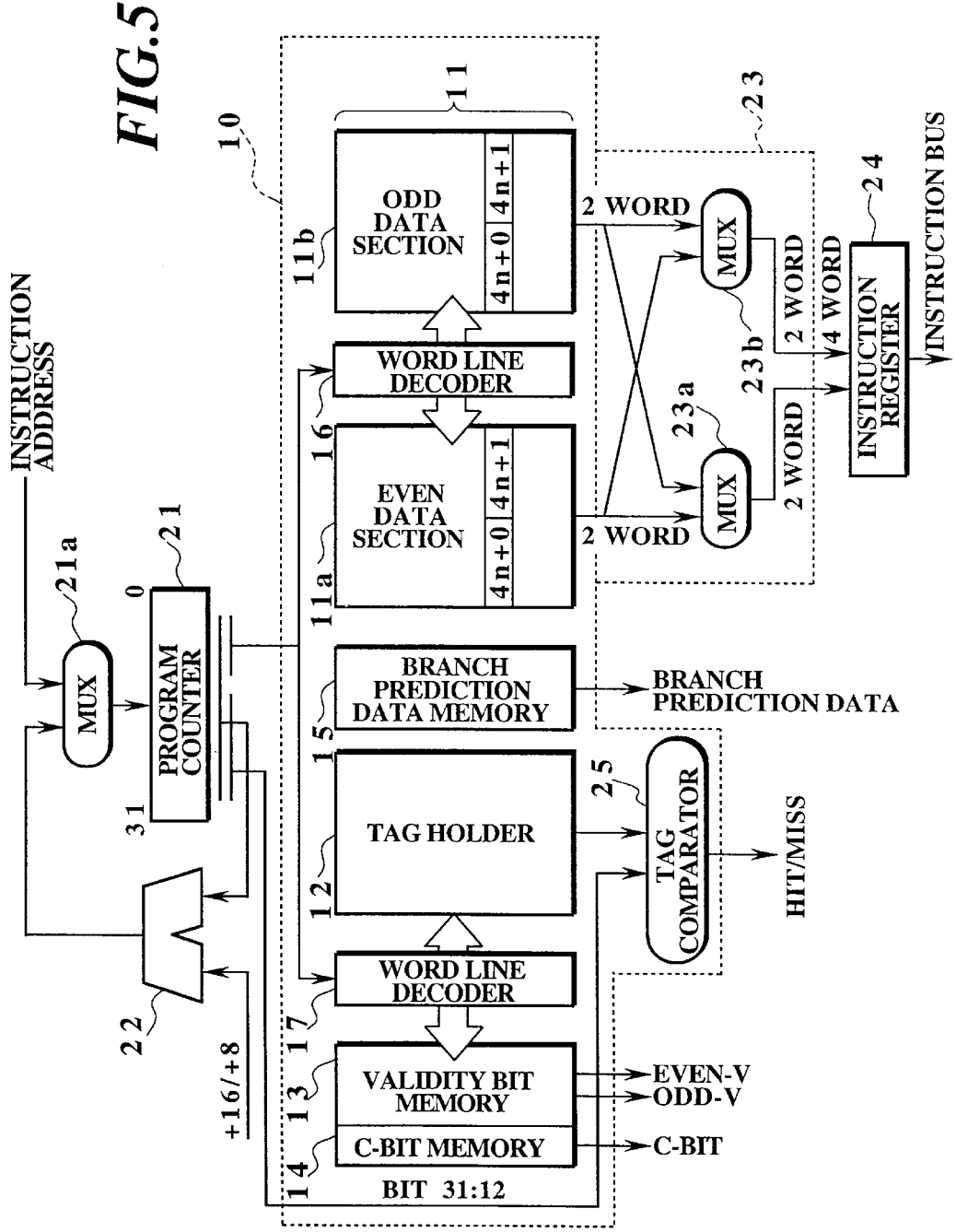
FIG. 5 shows a data processor according to a first embodiment of the present invention.

FIG. 5 shows a data processor according to the first embodiment of the present invention. The data processor supplies instructions to a CPU. An instruction cache 10 stores instructions. A program counter (PC) stores the address of an instruction to be executed next. An incremental circuit 22 increments the program counter 21. An instruction aligner 23 rearranges instructions read out of the instruction cache 10. An instruction register 24 stores the instructions provided by the instruction aligner 23. A controller (not shown) controls the operations of these elements.

The instruction cache 10 of this embodiment is a direct-map cache memory of four kilobytes and is composed of a data memory 11, a tag holder 12, a validity bit memory 13, a C-bit memory 14, and a branch prediction data memory 15.

The data memory 11 stores blocks of instructions (e.g., 4n+0 to 4n+3). Each block consists of sub-blocks each containing two words corresponding to two instructions. The data memory 11 consists of an even data section 11a and an odd data section 11b. The even data section 11a stores one sub-block, i.e., two words (4n+0 and 4n+1) of each block, and the odd data section 11b stores the other sub-block, i.e., the other two words (4n+2 and 4n+3) of each block. Each block in the data memory 11 consists of four words (corresponding to four instructions), and four words consist of 16 bytes. The data memory 11 stores 256 blocks in total. Any one of the blocks is selected by a word line decoder 16.

Each of the tag holder 12, validity bit memory 13, C-bit memory 14, and branch prediction data memory 15 stores a piece of data on every block stored in the data memory 11. A word line decoder 17 selects data among these elements for a given block stored in the data memory 11.

More precisely, the tag holder 12 stores tag addresses of the blocks stored in the data memory 11. The validity bit memory 13 stores even and odd validity bits serving as second information for the blocks stored in the data memory 11. The even validity bit for a given block indicates whether or not the sub-block (two words) of the block in question stored in the even data section 11a is valid. The odd validity bit for a given block indicates whether or not the sub-block (two words) of the block in question stored in the odd data section 11b is valid. The validity bit memory 13 has two ports for the even and odd data sections 11a and 11b.

The C-bit memory 14 stores C-bits for the blocks stored in the data memory 11, respectively. The C-bit for a given block indicates whether or not the given block is continuous from the preceding block in a main memory. Namely, the C-bit for a block n is as shown in Table 1:

TABLE 1

| C-bit | Meaning |
|---|---|
| 1 | Block n is continuous with block n-1 in main memory |
| 0 | Block n is discontinuous with block n-1 in main memory or unknown |

The branch prediction data memory 15 stores, for each block stored in the data memory 11, branch prediction data, cache lock data, cache control data, etc.

The instruction cache 10 also has a tag comparator 25 that compares a tag (FIG. 6) stored in the program counter 21 with a specified one of the tags stored in the tag holder 12 and provides a hit result or a mishit result. If the tag comparator 25 provides a hit result, a sub-block specified by the program counter 21 is accessed in the data memory 11. The instruction cache 10 is formed so that sub-blocks of different blocks are simultaneously accessible. This will be explained later with reference to FIGS. 7A and 7B.

The program counter 21 receives, from a multiplexer 21a, a 32-bit address for an instruction such as a branch instruction to be executed and provides the word line decoder 16 with a value contained in the received address. The program counter 21 is incremented by +16 or +8 by the incremental circuit 22.

Figure 6:
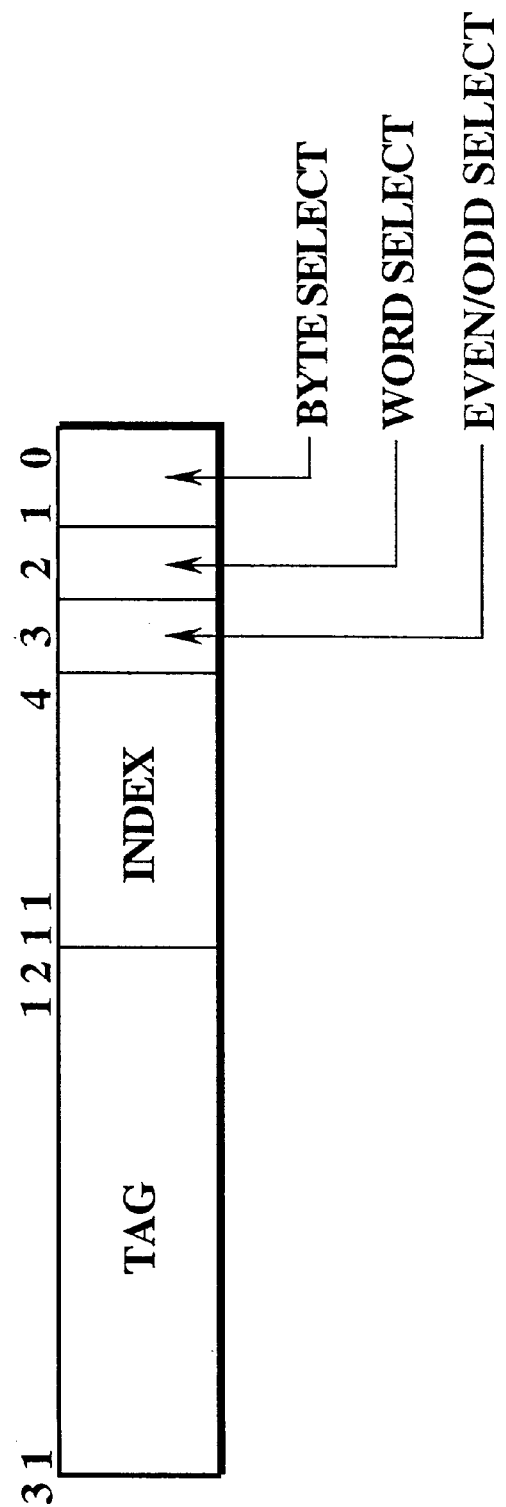
FIG. 6 shows the structure of an address in a program counter.

FIG. 6 shows an example of an instruction address stored in the program counter 21. The address consists of a tag (bits 31 to 12), an index (bits 11 to 4), and an offset (bits 3 to 0). The tag indicates a position of the instruction in the main memory, the Index specifies a block, and the offset represents data positions in the block. More precisely, the bit 3 of the offset is used to select one of the even and odd data sections 11a and 11b, the bit 2 is used to select a word, and the bits 1 and 0 are used to select a byte.

The instruction aligner 23 has two multiplexers 23a and 23b. Each of the multiplexers 23a and 23b once stores each two words from the even and odd data sections 11a and 11b, selects two among them in response to a corresponding C-bit, and sends the selected two words to the instruction register 24. Here, each word corresponds to an instruction.

The embodiment is capable of simultaneously reading data out of different blocks n and n+1. The structures of the word line decoders 16 and 17 to realize the simultaneous reading will be explained.

Figure 7A:
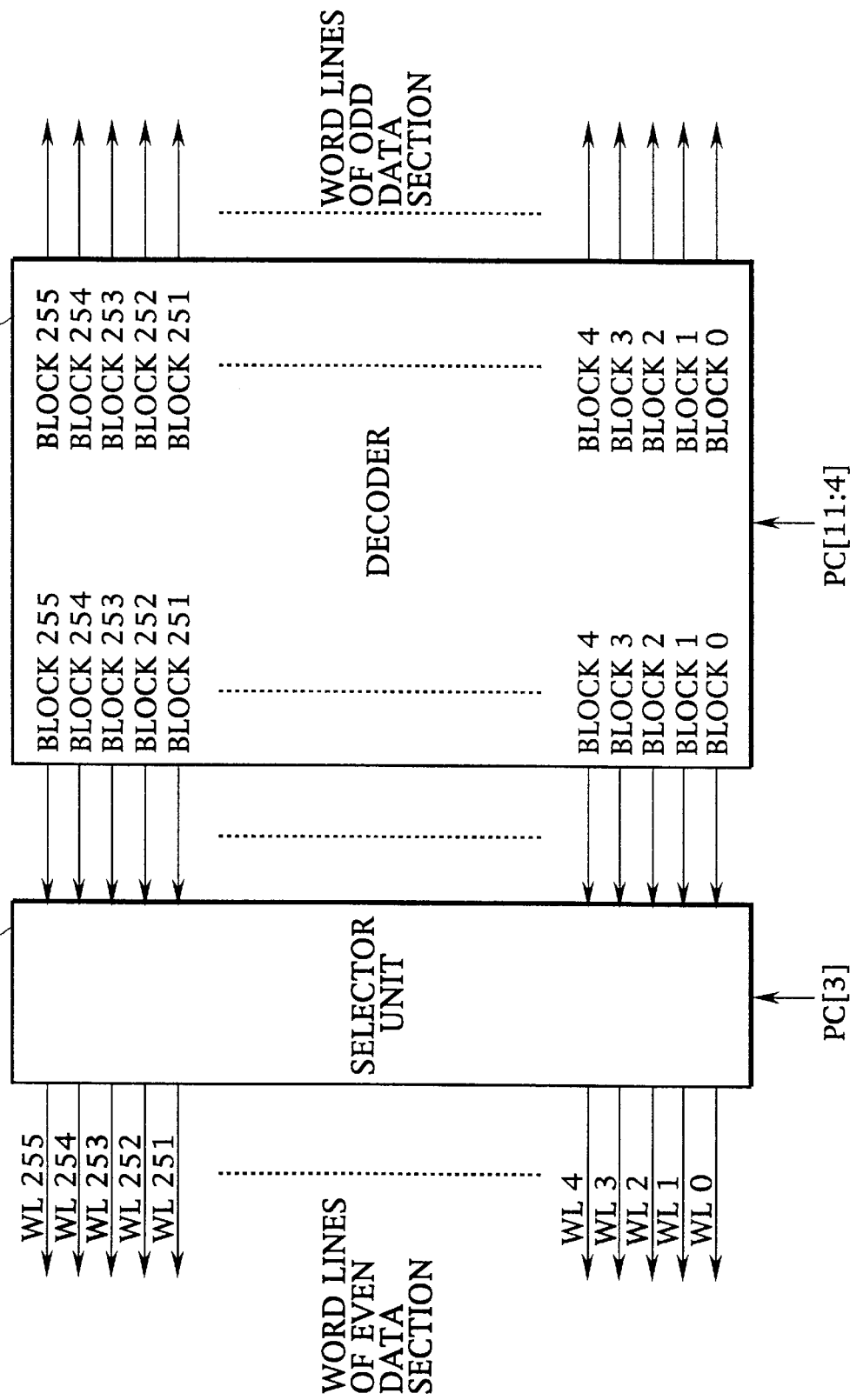
FIGS. 7A and 7B show a word line decoder of a data memory of the data processor of FIG. 5.
Figure 7B:
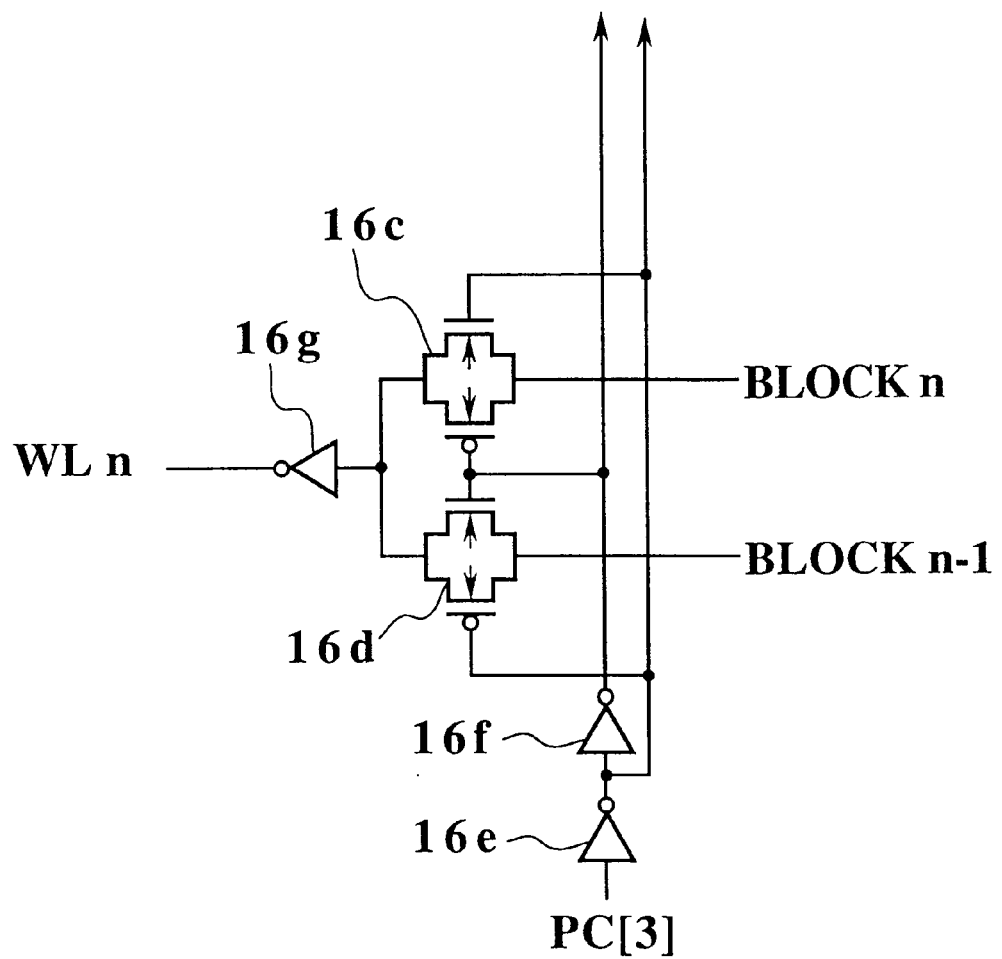

FIGS. 7A and 7B show an example of the word line decoder 16, in which FIG. 7A is a block diagram and FIG. 7B is a circuit diagram showing an essential part of the decoder 16.

In FIG. 7A, a decoder proper 16a decodes the bits 11 to 4 of the address stored in the program counter 21, to find out a word line (equivalent to a block). A selector 16b shifts the word line by one bit. Each selector element of the selector 16b is controlled by the bit 3 of the program counter 21 and is composed of transfer gates 16c and 16d and inverters 16e, 16f, and 16g as shown in FIG. 7B. The selector 16b is capable of reading data out of two blocks without putting load on the decoder proper 16a.

The word line decoder 17 has the same structure as the word line decoder 16.

Access operations (A), (B), and (C) to the instruction cache 10 will be explained.

(A) Read operation

When reading data out of the instruction cache 10, the word line decoders 16 and 17 decode the index (bits 11 to 4) of an address stored in the program counter 21, to specify a line or a block in the data memory 11, tag holder 12, validity bit memory 13, C-bit memory 14, and branch prediction data memory 15. In the selected line (block) of the data memory 11, one of the sub-blocks thereof is accessed.

The tag comparator 25 compares the tag (bits 31 to 12) of the address stored in the program counter 21 with a specified tag stored in the tag holder 12. If they agree with each other, the accessed data is read out of the instruction cache 10 and is supplied to the multiplexers 23a and 23b of the aligner 23.

This will be explained in more detail. Suppose a branch target instruction 4n+k is in a block n.

If k is 0 or 1, i.e., if the bit 3 of the program counter 21 is 0, the branch target instruction is 4n+0 or 4n+1 in the block n. Namely, this instruction is stored in the even data section 11a. Accordingly, words or instructions are read out of the even and odd data sections 11a and 11b in the same block n. Even and odd validity bits for the block n are read out of the validity bit memory 13. The read instructions are passed through the aligner 23 without changing their order and are stored in the instruction register 24.

If k is 2 or 3, i.e., if the bit 3 of the program counter 21 is 1, the branch target instruction is 4n+2 or 4n+3 in the block n. Namely, this instruction is stored in the odd data section 11b. Accordingly, words or instructions are read out of the odd data section 11b in the block n and the even data section 11a in a block n+1. In this case, the aligner 23 exchanges the words read out of the even data section 11a with the words read out of the odd data section 11b, and they are stored in the instruction register 24.

At the same time, an even validity bit for the block n+1 and an odd validity bit for the block n are read out of the validity bit memory 13. A C-bit for the block n+1 is read out of the C-bit memory 14. Only when the C-bit is 1 to indicate that the block n+1 is continuous with the block n and the even validity bit for the block n+1 is 1 to indicate validness, the instructions (words) read out of the even data section 11a are handled as correct, and in any other case, they are invalidated.

As mentioned above, if k of 4n+k is 0 or 1 with the bit 3 of the program counter 21 being 0, the word line decoders 16 and 17 carry out no one-bit shift, to thereby select the block n. If k is 2 or 3 with the bit 3 of the program counter 21 being 1, the decoders 16 and 17 carry out one-bit shift, to thereby select the blocks n and n+1. If the block n corresponds to the last word line, the block n+1 will be the first word line. Table 2 summarizes the read operation mentioned above.

TABLE 2

| Value of k | 0, 1 | 2, 3 |
|---|---|---|
| Even data providing block | n | n + 1 |
| Odd data providing block | n | n |
| Block with even validity bit of 1 | n | n + 1 |
| Block with odd validity bit of 1 | n | n |
| Block with C-bit of 1 (mod. 256) | n + 1 | n + 1 |

The same operation is carried out in the next cycle. Namely, an instruction to be read first determines the read operation.

Incremental operation of the program counter 21 will be explained. If a branch occurs, a branch target address is set in the program counter 21 without incremental operation. If no branch occurs and if k in 4n+k is 0 or 1, the incremental circuit 22 increments the program counter 21 by +16. If no branch occurs, k in 4n+k is 2 or 3, a C-bit for a block n+1 is 1, and an even validity bit for the block n+1 is 1, the incremental circuit 22 increments the program counter 21 by +16. In other cases, the incremental circuit 22 increments the program counter 21 by +8. Table 3 is a summary of these operations:

TABLE 3

| k | Increment in program counter |
|---|---|
| 0, 1 | 16 |
| 2, 3 | 16 (with C-bit and even validity bit being each 1) |
| 2, 3 | 8 (other cases) |

(B) Refill operation

If the tag comparator 25 provides a mishit result, the corresponding block in the data memory 11 is refilled with required instructions fetched from the main memory. Unlike the prior art, the present invention sets a C-bit for the block in question as mentioned below.

(C) C-bit update operation

If the refill operation is for a branch target instruction, the refilled block (or line) must be discontinuous from the preceding block (or line), although there is a possibility that it is continuous from the preceding line. Accordingly, the C-bit for the refilled block is cleared to 0. If the refill operation is for a non-branch instruction, the refilled block is continuous from the preceding block, and the C-bit for the refilled block is set to 1.

When reading the refilled block that is continuous from the preceding block, the C-bit for the block is set to 1 because there is a possibility that the C-bit has been cleared to 0 at the time of refilling.

When a given block in the data memory 11 is invalidated in response to a cache instruction or a snoop operation, the C-bit for the block is cleared to 0.

In this way, if sub-blocks are read out of adjacent blocks in the data memory 11, the embodiment rearranges the sub-blocks in order, to form a continuous string of words of instructions with a branch target instruction, if any, being always put at the head of the block. Consequently, the embodiment improves the efficiency of supplying instructions with simple hardware.

FIG. 8 is a block diagram showing a data processor according to the second embodiment of the present invention. The same parts as those of FIG. 5 are represented with like reference marks.

The second embodiment relates to a set-associative cache memory. A main memory and a cache memory are divided into an identical number of groups or sets, and an access between the main memory and the cache memory is allowed only between corresponding sets.

The second embodiment employs two sets. An instruction cache 30 has a data memory 31. The data memory 31 has even data sections 31a and 31b corresponding to the sets 0 and 1, respectively, and odd data sections 31c and 31d corresponding to the sets 0 and 1, respectively. Similarly, for the sets 0 and 1, the instruction cache 30 has tag memories 32a and 32b, validity bit memories 33a and 33b, C-bit memories 34a and 34b, and tag comparators 45a and 45b. In addition, the instruction cache 30 has P-set data memories 35a and 35b that are characteristic to this embodiment.

Each of the P-set data memories 35a and 35b stores P-set data (third information) for each block, to indicate a set from which the block in question is continuous. An aligner 43 has multiplexers 43a and 43b each for selecting one of the sets 0 and 1, and multiplexers 43c and 43d that correspond to the multiplexers 23a and 23b of FIG. 5.

An operation of reading data out of the same block in the even and odd data sections is the same as that of the first embodiment. An operation of reading data out of different blocks in the even and odd data sections will be explained.

Suppose an instruction 4n+k is accessed. Data is read out of a block n in one of the odd data sections 31c (set 0) and 31d (set1) according to comparison results provided by the tag comparators 45a and 45b. This is done in a usual cache memory accessing manner. Then, data is read out of a block n+1 in one of the even data sections 31a (set 0) and 31b (set 1). Namely, C-bits and P-set data for the block n+1 are checked to select data that is continuous with the data selected in the odd data sections. If both data in the even data sections 31a and 31b are discontinuous with the selected data, a cache miss process or a cache miss possibility process will be carried out.

Updating the P-set data will be explained.

After refilling or reading the set 0 or 1 of a first block, the refilled or read set is registered (not shown). Then, the set 0 or 1 of a second block is refilled. If this refilling of the second block occurs due to a branch target instruction, a C-bit for the set in question of the second block is cleared to 0, and therefore, P-set data for the same set is not processed. If the refilling of the set in question of the second block occurs due to a non-branch instruction, the C-bit for the set in question of the second block is set to 1, and the P-set data for the set in question of the second block is set to the registered set.

When reading the set 0 or 1 of a given block that is continuous with the preceding block, a C-bit for the set in question of the given block is set to 1, and P-set data for the same set is set to the set 0 or 1 of the preceding block that has been read. At this time, P-set data for the other set of the given block is examined. If the examined P-set data is equal to the newly set P-set data, the new one is preserved and the examined one is invalidated. At the same time, a C-bit corresponding to the invalidated P-set data is cleared to 0.

The second embodiment provides the same effect as the first embodiment.

Figure 9:
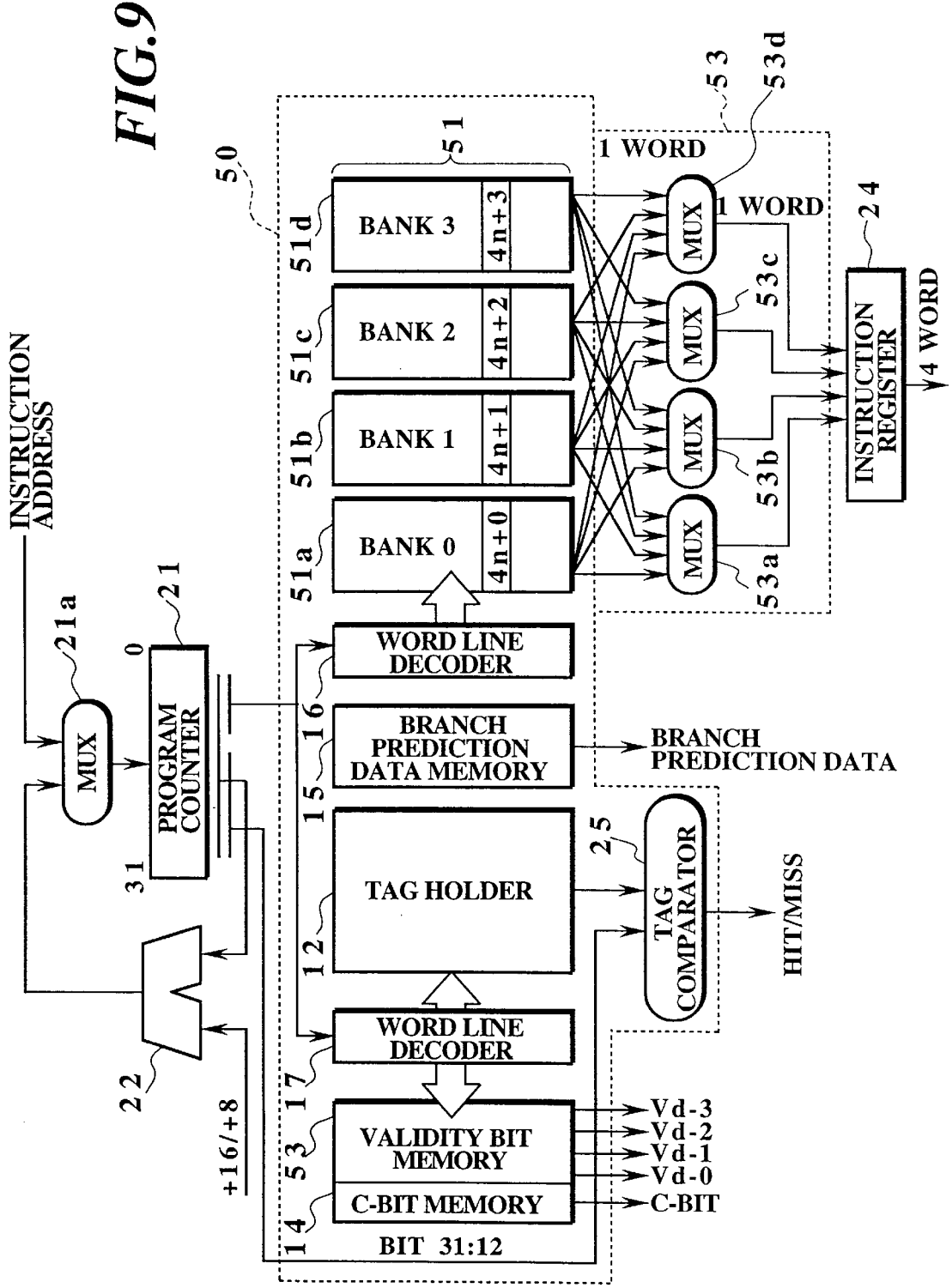
FIG. 9 shows a data processor according to a third embodiment of the present invention.

FIG. 9 is a block diagram showing a data processor according to the third embodiment. The same parts as those of FIG. 5 are represented with like reference marks.

Unlike the first and second embodiments that divide a data memory of an instruction cache into even and odd data sections, the third embodiment divides the same into word sections.

Namely, the third embodiment forms each block with four words. A data memory 51 is composed of four banks 51a to 51d that store words of each block, respectively. A validity bit memory 53 stores validity bits Vd-0 to Vd-3 for each block. An aligner 53 has four multiplexers 53a to 53d each of which receives four words from the banks 51a to 51d and selects one among them.

Figure 10A:
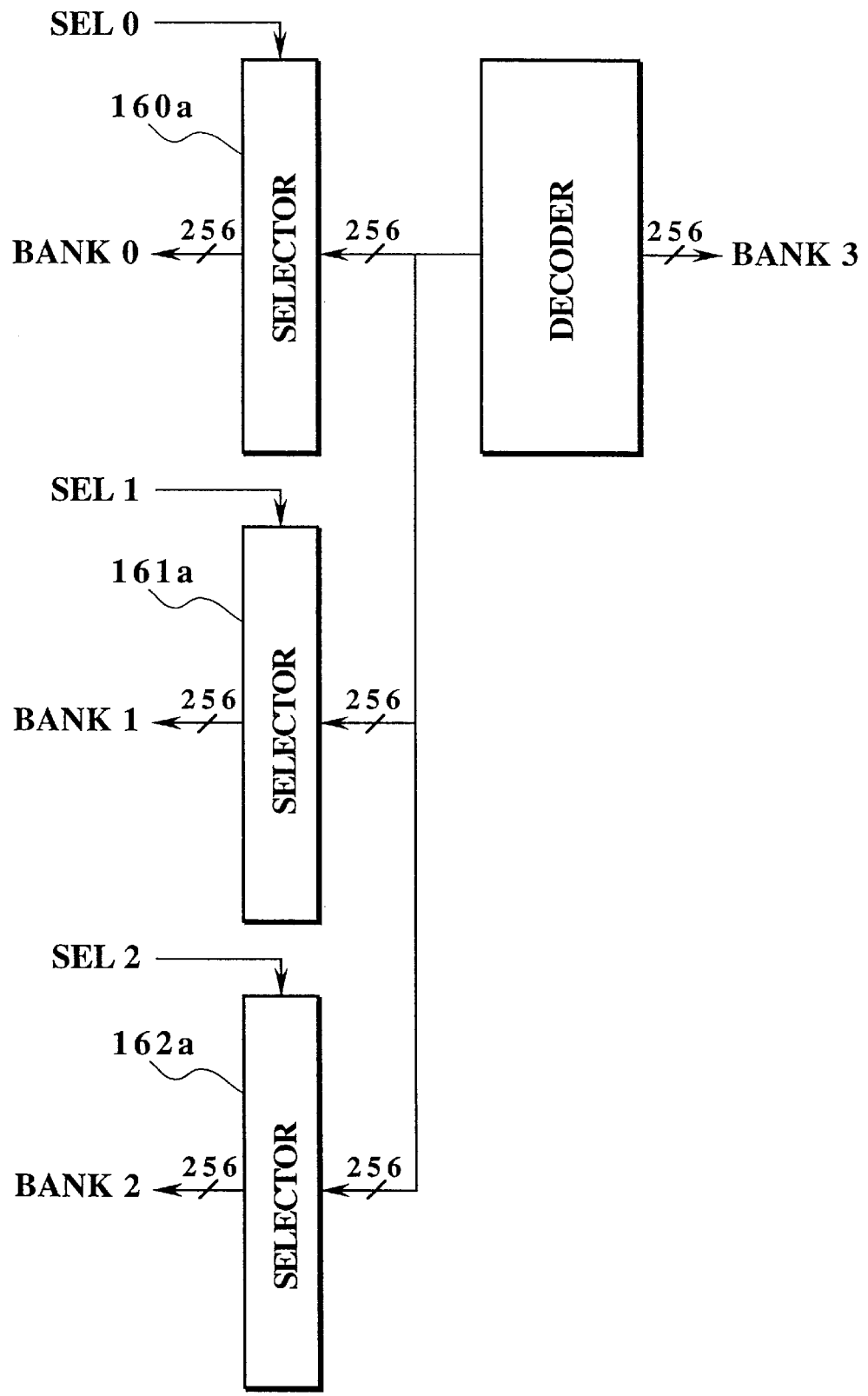
FIGS. 10A and 10B show a word line decoder of a data memory of the data processor of FIG. 9.
Figure 10B:
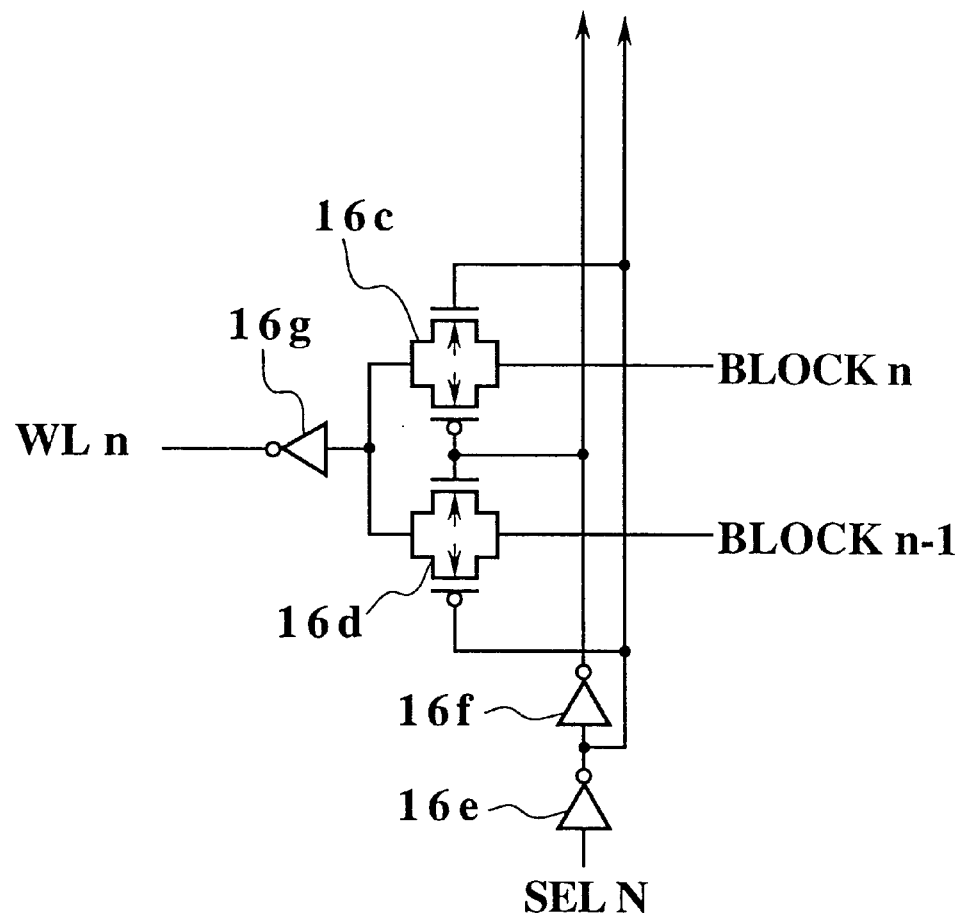

FIG. 10A shows selectors 160a, 161a, and 162a provided for the banks 51a to 51c, respectively. These selectors shift, as and when required, a word line specified by bits 11 to 4 stored in a program counter. FIG. 10B shows the details of one of the selectors 160a to 162a. This structure is basically the same as that of FIG. 7 but is different therefrom in that the selectors 160a to 162a receive control signals Sel-N instead of the bit 3 of the program counter. FIG. 11 shows logic circuits for generating the control signals given to the selectors 160a to 162a. Table 4 shows relationships between the bits 3 and 2 of the program counter (PC) and lines (blocks) selected in the banks 0 to 3.

TABLE 4

| PC bits 3 & 2 | Bank 0 | Bank 1 | Bank 2 | Bank 3 |
| --- | --- | --- | --- | --- |
| 00 | 4n | 4n | 4n | 4n |
| 01 | 4n + 4 | 4n | 4n | 4n |
| 10 | 4n + 4 | 4n + 4 | 4n | 4n |
| 11 | 4n + 4 | 4n + 4 | 4n + 4 | 4n |

This arrangement improves memory accessing efficiency further than the first and second embodiments.

As explained above, the present invention rearranges sub-blocks in order if the sub-blocks have belonged to different blocks, so that a branch instruction, if any, is always brought to the head of a block, to improve the efficiency of supplying instructions.

If sub-blocks are read out of adjacent blocks in a data memory and if first information related to the adjacent blocks indicates that the adjacent blocks are continuous with each other, the present invention employs simple hardware to rearrange the read sub-blocks so that words contained in the sub-blocs are arranged in sequence.

The present invention employs second information to validate or invalidate a block. If a given block has valid second information, the present invention validates the block, and if it has invalid second information, invalidates the block, thereby achieving a correct read operation.

The present invention may rearrange data read out of a cache memory word by word, to improve cache accessing efficiency.

What is claimed is:

1. A data processor comprising:

a program counter for storing the positional data of an instruction to be executed;

a data memory for storing blocks of instructions, each block of instructions being divided into at least two sub-blocks in said data memory;

a tag holder for holding tags related to the blocks stored in said data memory, the tags indicating the positions of the blocks in an external main memory;

a tag comparator for comparing a tag contained in the positional data stored in said program counter with a specified one of the tags stored in said tag holder and providing a hit result or a mishit result, said data memory, tag holder, and tag comparator forming a cache memory;

means for reading, if said tag comparator provides a hit result, a block of instructions simultaneously out of said data memory according to the positional data stored in said program counter, the block to be read being composed of sub-blocks that belong to the same block or different blocks in said data memory, and refilling, if said tag comparator provides a mishit result, said data memory with required instructions fetched from the external main memory; and an aligner for rearranging the read sub-blocks if the sub-blocks have belonged to different blocks in said data memory.

2. The data processor as claimed in claim 1, wherein:

the cache memory stores first information for each of the blocks stored in said data memory, to indicate whether or not the block is a continuation of the preceding block;

said data memory is formed so that the sub-blocks of adjacent blocks in the data memory are separately accessible according to partial information stored in said program counter; and said aligner rearranges read sub-blocks in order if the sub-blocks have belonged to different blocks in said data memory and if the first information related to the different blocks indicates that the different blocks are continuous with each other.

3. The data processor as claimed in claim 2, wherein the cache memory stores second information for each of the blocks stored in said data memory, to indicate whether or not the sub-blocks of the block are valid, and any block of instructions read out of said data memory is validated or invalidated according to the second information corresponding thereto.

4. A data processor comprising:

a program counter for storing the positional data of an instruction to be executed;

a data memory for storing blocks of instructions, each block being composed of sub-blocks in said data memory;

a tag holder for holding tags related to the blocks stored in said data memory, the tags indicating the positions of the blocks in an external main memory that is divided into a plurality of sets;

a tag comparator for comparing a tag contained in the positional data stored in said program counter with a specified one of the tags stored in said tag holder and providing a hit result or a mishit result, said data memory, tag holder, and tag comparator forming a set-associative cache memory; and means for reading, if said tag comparator provides a hit result, a block of instructions simultaneously out of said data memory according to the positional data stored in said program counter, the block to be read being composed of sub-blocks that belong to the same block or adjacent blocks in said data memory, and refilling, if said tag comparator provides a mishit result, said data memory with required instructions fetched from a corresponding one of the sets of the external main memory, wherein:

the cache memory stores first information for each of the blocks stored in said data memory, to indicate whether or not the block is a continuation of the preceding block, said data memory is formed so that the sub-blocks of adjacent blocks in said data memory are separately accessible according to partial information stored in said program counter, and read sub-blocks are rearranged in order if the sub-blocks have belonged to adjacent blocks in said data memory and if the first information related to the adjacent blocks indicates that the adjacent blocks are continuous with each other.

5. The data processor as claimed in claim 4, wherein the cache memory stores third information for each of the blocks stored in said data memory, to indicate a set with which the block is continuous, and any sub-block read out of said data memory is validated or invalidated according to the third information corresponding thereto.

6. A data processor comprising:

a program counter for storing the positional data of an instruction to be executed;

a data memory for storing blocks of instructions, each block of instructions being divided into words in said data memory;

a tag holder for holding tags related to the blocks stored in said data memory, the tags indicating the positions of the blocks in an external main memory;

a tag comparator for comparing a tag contained in the positional data stored in said program counter with a specified one of the tags stored in said tag holder and providing a hit result or a mishit result;

a cache memory composed of said data memory, tag holder, and tag comparator, said cache memory storing first information for each of the blocks stored in said data memory, to indicate whether or not the block is a continuation of the preceding block;

means for reading, if said tag comparator provides a hit result, a block of words simultaneously out of said data memory according to the positional data stored in said program counter, the read words belonging to the same block or different blocks in said data memory, and refilling, if said tag comparator provides a mishit result, said data memory with required instructions fetched from the external main memory; and means for rearranging the read words if the words have belonged to adjacent blocks in said data memory and if the first information related to the adjacent blocks indicates that the adjacent blocks are continuous with each other.

\* \* \* \* \*